No. 791,623. PATENTED JUNE 6, 1905.
A. E. HOLMES.
HOE.
APPLICATION FILED SEPT. 15, 1904.
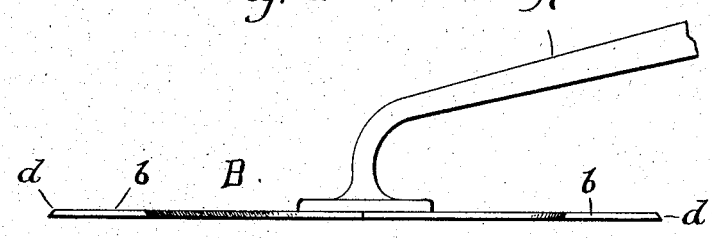
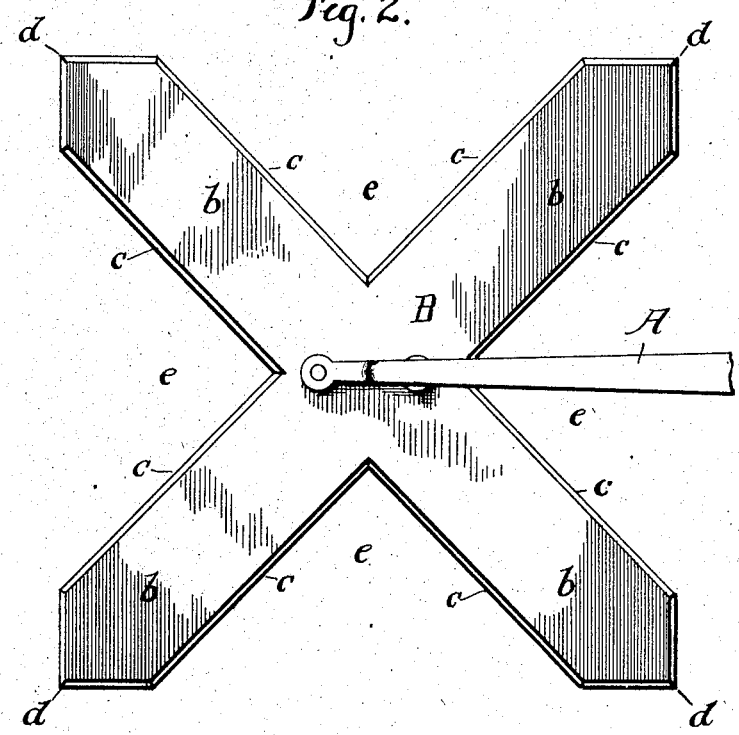

No. 791,623.

Patented June 6, 1905.

UNITED STATES PATENT OFFICE.

ALBERT E. HOLMES, OF MILWAUKEE, OREGON.

HOE.

SPECIFICATION forming part of Letters Patent No. 791,623, dated June 6, 1905.

Application filed September 15, 1904. Serial No. 224,564.

*To all whom it may concern:*

Be it known that I, ALBERT E. HOLMES, a citizen of the United States of America, and a resident of Milwaukee, county of Clackamas, State of Oregon, have invented certain new and useful Improvements in Hoes, of which the following is a full and clear specification, reference being had to the accompanying drawings, in which—

Figure 1 is a side elevation, and Fig. 2 a plan, of my improved device.

The object of this invention is to provide a garden-hoe which shall be especially adapted for weeding; and it consists of certain novel features of construction hereinafter described, and pointed out in the claims appended.

In the drawings, A designates the shank of the handle, and B the blade, which is attached to the handle at such an angle that when the operator is standing upright in an easy natural position the blade will be horizontally disposed with reference to the surface of the ground. The shank is attached to the center of the upper side of the blade, and the blade is approximately star shape, being composed of four radial members or branches $b$, which join directly at their inner ends and are sharpened around their entire edges. The side or longitudinal edges $c$ of each member $b$ are approximately parallel except at their outer ends, where they converge to a sharp point $d$. Two of the blades $b$ incline outwardly and forwardly from the point of attachment to the shank, and the remaining two incline rearwardly and outwardly from the same point, thereby forming a series of four crotches $e$, one at the front, one at the back, and one at each side.

By constructing the blade in the manner above set forth and sharpening its edges entirely around I produce a hoe having peculiar advantages in weeding a garden. The operator without moving from the center of the furrow may, as he proceeds along the furrow, cut out the weeds in all directions without injuring the growing plants. The hoe, as is obvious, may be pushed directly forward or jerked directly rearward or worked toward either side and also at an angle forward or backward without the operator changing his position, which capability enables the gardener to quickly and thoroughly cut out the weeds without injuring the plants.

It will be observed that an essential feature lies in angularly disposing the series of radial members and in pointing and sharpening their edges and also in so disposing the shank with reference to the blade that the four crotches will be presented at the four sides of the blade.

Having thus described my invention, what I claim as new, and desire to secure by Letters Patent, is—

1. A weeding-hoe consisting of a shank and a horizontal blade attached thereto and comprising a series of four radially-disposed members $b$, forming four crotches of approximately equal size, one crotch at the front side, one at the rear and one at each side of the blade, each of said radial members having its outer end pointed and sharpened and its opposite edges made parallel and sharpened, as and for the purposes set forth.

2. A weeding-hoe consisting of a shank and a horizontal blade attached thereto and comprising a series of four radially-disposed members forming four crotches, one at each side, and each having its extreme end pointed and its entire edge sharpened, as and for the purposes set forth.

In testimony whereof I hereunto affix my signature, in the presence of two witnesses, this 7th day of September, 1904.

ALBERT E. HOLMES.

Witnesses:
JOHN T. WHALLEY,
G. A. STEEL.